United States Patent
Bond et al.

(10) Patent No.: US 7,978,854 B2
(45) Date of Patent: Jul. 12, 2011

(54) ASYMMETRIC KEY GENERATION

(75) Inventors: Robert W. Bond, Powder Springs, GA (US); John R. Dingler, Dallas, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/054,579

(22) Filed: Mar. 25, 2008

(65) Prior Publication Data

US 2009/0245515 A1    Oct. 1, 2009

(51) Int. Cl.
*H04K 1/00* (2006.01)
*H04L 9/00* (2006.01)

(52) U.S. Cl. ........................ 380/255

(58) Field of Classification Search ........... 380/255, 380/259, 274, 279; 713/168, 171
See application file for complete search history.

(56) References Cited

U.S. PATENT DOCUMENTS

| | | | |
|---|---|---|---|
| 7,095,851 B1 | 8/2006 | Scheidt | |
| 7,366,905 B2 * | 4/2008 | Paatero | 713/175 |
| 2002/0039420 A1 * | 4/2002 | Shacham et al. | 380/277 |
| 2005/0120203 A1 * | 6/2005 | Yeh et al. | 713/156 |
| 2006/0013403 A1 * | 1/2006 | Huber et al. | 380/285 |
| 2006/0083370 A1 * | 4/2006 | Hwang | 380/28 |

OTHER PUBLICATIONS

Mazzeo et al., FPGA-based Implementation of a Serial RSA Processor, IEEE Computer Society, 2003, 6 Sheets.

Kejariwal, Arun, Cryptic Primes, IEEE Potentials, Feb./Mar. 2004, p. 43-45.

Wollinger et al., Security on FPGAs: State-of-the-Art Implementations and Attacks, ACM Transactions on Embedded Computing Systems, Aug. 2004, p. 534-574, vol. 3, No. 3.

Raya et al., The Security of Vehicular Ad Hoc Networks, Laboratory for Computer Communications and Applications (LCA), Nov. 7, 2005, p. 11-21.

\* cited by examiner

*Primary Examiner* — Emmanuel L Moise
*Assistant Examiner* — Ali S Abyaneh
(74) *Attorney, Agent, or Firm* — Patrick J. Daugherty; Driggs, Hoff, Daugherty & Del Zoppo Co., LPA

(57) ABSTRACT

In asymmetric cryptography, initially-set public key and private keys are updated as a function of the chosen prime number pair, a host sending an updated public key exponent and a unique prime-pair key associated with the chosen prime number pair to the client, the client using the unique prime-pair key to look-up and retrieve the chosen prime number pair and determine the updated public key and the updated private key as a function of the retrieved chosen prime number pair, the host and the client encrypting and decrypting exchanged messages with the updated public key and the updated private key without executing another handshake. In one aspect, a large even integer is used by host and client to generate a plurality of prime number pairs, and the unique prime-pair key may be a distance between each prime number of an associated prime number pair.

20 Claims, 3 Drawing Sheets

ASYMMETRIC KEY GENERATION

FIELD OF THE INVENTION

The present invention generally relates to encryption, and more particularly to methods, systems, and program products for revising encryption keys.

BACKGROUND OF THE INVENTION

Asymmetric cryptography is a form of cryptography which utilizes a pair of keys for encrypting and decrypting a message, a public key and a private key. The public keys are used to encrypt messages that only private keys can decrypt based on a mathematical relationship between the keys. The public key can be shared with anyone, but the private key is kept confidential and secret by communicating users.

Encryption security is dependent upon keeping the private key secret and confidential. One way to increase system security is to change the private key with a reasonable frequency. As it may be undeterminable whether a private key has been divulged inadvertently or intentionally, regular resetting of a private key will reestablish system security, at least while each new private key remains secret. However, problems arise in efficiently changing private and public keys in prior art asymmetric cryptography systems. In one aspect, once determined the public key and private key may not be changed during the course of an established secured interaction between a message sender and a receiver. The keys remain static for an entire handshake transaction in prior art wireless encryption or network encrypted traffic, and in the case of a long-running message, wherein the encryption keys cannot be changed on the fly without terminating the transaction or message. Moreover, prior art asymmetric cryptography systems and methods must often reestablish new keys if an entire handshake between an encrypted message producer and consumer must be reestablished, a time consuming and resource-intensive process.

Thus, there is a need for improved methods and systems that address the above problems, as well as others.

SUMMARY OF THE INVENTION

Asymmetric cryptography methods comprise host and client computers executing a handshake, the handshake authorizing the exchange of messages encrypted and decrypted with an initially-set private key and an initially-set public key. The host chooses one of a plurality of prime number pairs stored on a host storage means, each of the plurality of prime number pairs stored in association with a unique prime-pair key, and updates the initially-set public key and the initially-set private key as a function of the chosen prime number pair, the updating comprising determining an updated public key exponent. Further, the host sends the updated public key exponent and the unique prime-pair key associated with the chosen prime number pair to the client, the client using the unique prime-pair key to look-up and retrieve the chosen prime number pair from the plurality of prime number pairs stored on a client storage means and determining the updated public key and the updated private key as a function of the retrieved chosen prime number pair and the received updated public key exponent. The host and the client further encrypt and decrypt exchanged messages with the updated public key and the updated private key without executing another handshake.

Some methods further comprise the host selecting a large even integer and sending the large even integer to the client; the host generating the plurality of prime number pairs from the selected large even integer, the prime number pair plurality comprising all prime number pairs that can sum to the selected large even integer, and the host associating each pair of the prime number pair plurality with the unique prime-pair key; and the client generating the prime number pair plurality from the selected large even integer received from the host, and the client storing the prime number pair plurality in a client storage means by associating each said pair with the associated unique prime-pair key.

In some methods, the host and the client associate each pair of the prime number pair plurality with the unique prime-pair key by determining each unique prime-pair key with a data size smaller than a data size of an associated prime number pair. Some examples comprise determining a unique prime-pair key as a distance between each prime number of an associated prime number pair.

In some methods, host and client updating the initially-set public key and the initially-set private key comprise determining a modulus equal to a product of each prime number of the chosen prime number pair; determining a totient number of positive integers less than or equal to the modulus that are relatively prime to the modulus; determining the updated public key as comprising the modulus and a public key integer exponent, the public key integer exponent greater than one but less than the totient number and coprime to the totient number; and determining the updated private key as comprising the modulus and a private key integer exponent, the private key integer exponent congruent to the public key exponent. And in some methods, the host randomly chooses the large even integer or the chosen prime number pair.

In another aspect, methods are provided for producing computer executable program code, storing the produced program code on a computer readable medium, and providing the program code to be deployed to and executed on a computer system thereby providing a computer infrastructure being operable to perform one or more of the method and/or process elements described above, for example by a service provider who offers to implement, deploy, and/or perform functions for others. Still further, an article of manufacture comprising a computer usable medium having the computer readable program embodied in said medium may be provided. Such program codes comprise instructions which, when executed on the computer system, cause a computer system to perform one or more of the method and/or process elements described above. Moreover, systems, articles and programmable devices configured for performing one or more of the method and/or process elements of the present invention, for example as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
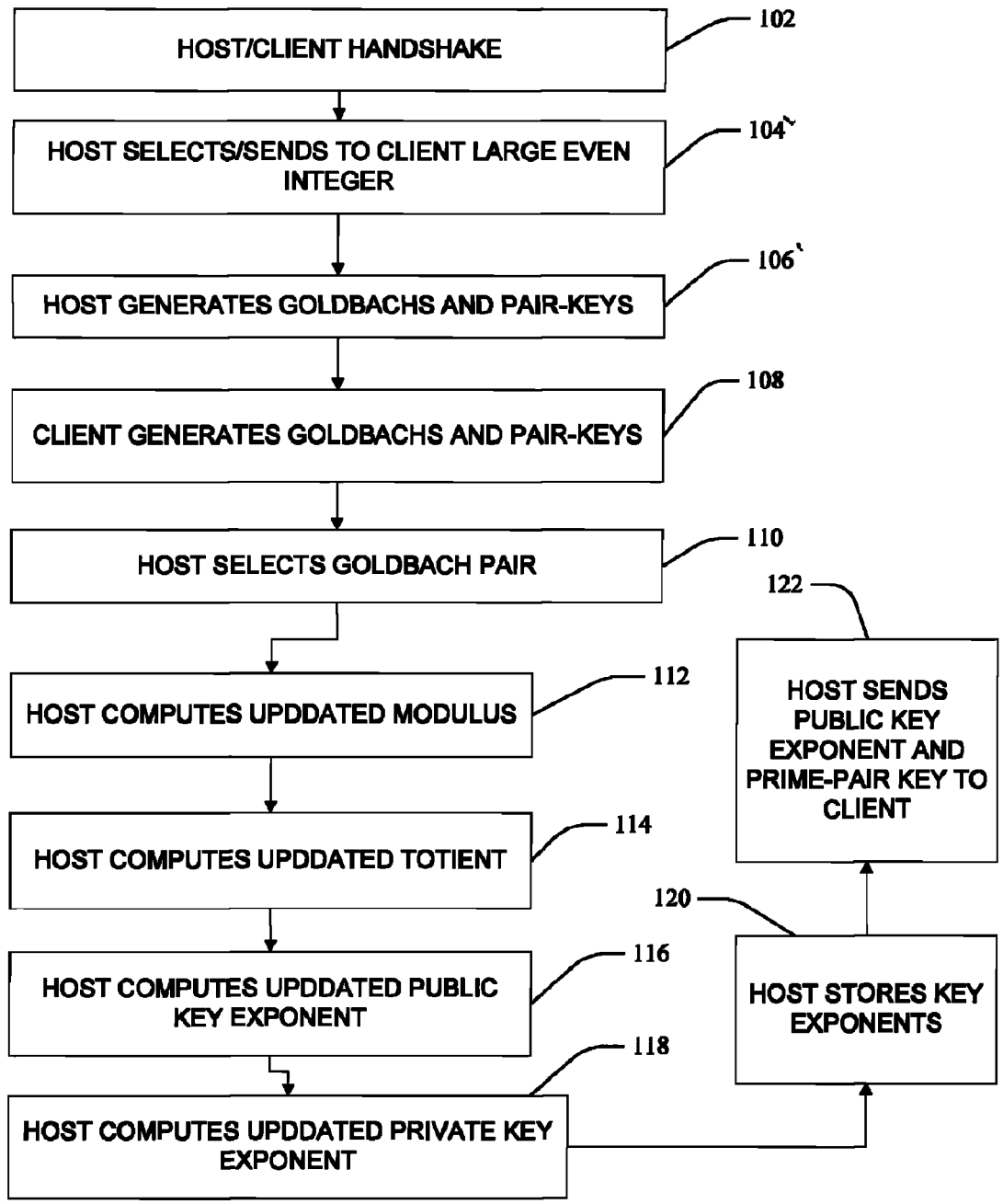
FIG. 1 is a flow chart illustrating a process and system for asymmetric cryptography according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
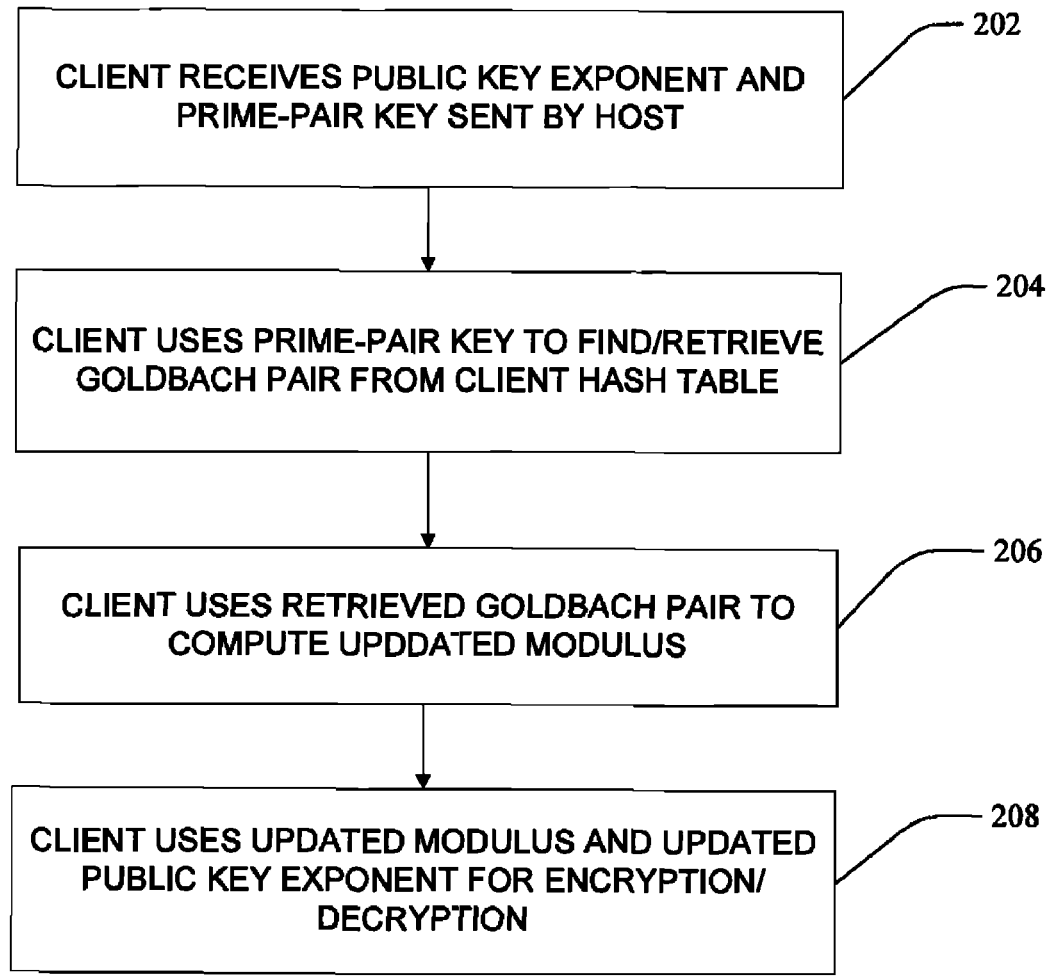
FIG. 2 is a flow chart illustrating a process and system for asymmetric cryptography according to the present invention.

For convenience purposes, the Detailed Description of the Invention has the following sections:
I. General Description
II. Computerized Implementation I. General Description FIGS. 1 and 2 illustrate one embodiment of an asymmetric cryptography method and process according to the present invention. Referring now to FIG. 1, at 102 host and client computers execute a handshake to authorize and enable the sending of encrypted messages back and forth through encryption utilizing in initially-set pair of private and public keys. At 104 the host computer selects a large even integer and sends the large even integer to the client. At 106 the host generates and stores a hash table comprising all Goldbach pairs for the selected even integer, and at 108 the client receives the integer and generates and stores a hash table comprising all the Goldbach pairs for the received even integer.

More particularly, the Goldbach pairs are all prime number pairs that can sum to the large even integer, as understood by reference to "Goldbach's Conjecture" asserting that all positive even integers greater than or equal to four can be expressed as the sum of two primes. Prime numbers may be pre-generated and accessible from a data storage means, or generated using the following "Sieve of Eratoshenese" algorithm:

```
void gen_primes(n)
{
    int i,j;
    for(i = 0; i < n; i++) primes[i] = 1;
    for(i =2; i <= (int)sqrt(n); i++)
        if (primes[i])
            for(j = i; j*i < n; j++) primes[i*j] = 0;
}
```

Hash table Goldbach prime pairs may then be determined from the stored or generated primes through the following algorithm:

```
FindGoldbach (int n){
    for (x = 2; x < numberofprimes(n); x++){
        for (y = 2; y<numberofprimes(n);y++){
            if(prime[x] + prime[y] == n)
                addGoldbachPair(n);
        }
    }
}
```

Other method and processes for generating Goldbach prime pairs will also be apparent to one skilled in the art, and the present invention is not limited to the examples described herein. In some embodiments, rather than select and exchange large even integers and generate the primes and/or identify and store the Goldbach primes at 104, 106 and 108, Goldbach prime pairs and their prime-pair keys may be pre-generated and stored in hash tables on each of the client and host for subsequent public and private key updating use; however, system security may be enhanced through use of the shared large integer selection and Goldbach prime number pair and prime-pair key generation processes 104/106/108 described above.

Storing the Goldbach prime number pairs comprises storing each number pair as a value and also with a key unique to each prime number pair, the prime-pair keys stored in lists on the host and client respectively. In one example, the unique prime-pair key is the distance ($\Delta$) between the values of the prime number pair: for example, for a prime number pair of 47 and 53 the prime-pair key is $\Delta=6$. Transmitting the smaller number distance ($\Delta$) between the values rather than the larger prime-pair numbers themselves provide advantages in minimizing the amount of data sent during an encryption key, thereby enhancing system efficiencies. It will also be understood that alternative unique prime pair identification keys may also be practiced according to the present invention, with commensurate efficiency advantages where the alternative prime-pair key data is smaller or less complex than the actual prime-pair numbers identified thereby.

Encrypted message exchange continues between the host and the client with current public and private keys until the host initiates a change in encryption keys by randomly choosing one of the prime number pairs and from it's hash table/list at 110 and initiating revised/updated key generation at 112. The present embodiment is configured to use RSA asymmetric cryptography, which refers to a system or method for using public and private keys to encrypt and decrypt messages developed by Ron Rivest, Adi Shamir and Leonard Adleman, though it will be understood that other forms of asymmetric cryptography may be practiced with the present invention in other embodiments. Thus, a Goldbach prime pair $(p, q)$ selected at 110 is used by the host computer to determine a modulus n at 112 for revised/updated public and private keys, the modulus equal to the product of the prime pair, $n=p*q$.

Next, at 114 the number of positive integers less than or equal to the modulus that are coprime or relatively prime to the modulus (i.e. their greatest common divisor is 1), also known as the totient $\Phi(n)$, is computed as a function of the selected Goldbach prime pair, $\Phi(n)=(p-1)(q-1)$.

The host determines a revised/updated public key at 116 comprising the modulus and an integer exponent e determined such that $1<e<\Phi(n)$ and e is coprime to $\Phi(n)$, $\gcd(e, \Phi(n))=1$. The resultant public key configured for release thus comprising (n, e).

The host determines a secret revised/updated private key at 118 as comprising the modulus and a private key exponent d, wherein the private key exponent is computed to satisfy a congruence relation with the public key exponent, and more particularly where $d*e=1 \pmod{\Phi(n)}$, $d*e=1+k\Phi(n)$ for some integer k.

At 120 the private key exponent d and the public key exponent e are stored on the host and used for encryption for current and future message transmission to the client, and at 122 the public key exponent e and the prime-pair key (in the present embodiment the distance $\Delta$ between the values of the prime pair p and q) are sent to the client.

Referring now to FIG. 2, at 202 the client receives the public key exponent e and the unique prime-pair key $\Delta$ and at 204 uses the prime-pair key $\Delta$ to look-up and retrieve the associated prime pair (p,q) from its client hash table/prime-pair key list generated at 108. Then at 206 using the retrieved Goldbach prime-pair (p,q) the client determines the new/revised modulus n for the new/revised public and private keys as the product of the prime pair, $n=p*q$, and at 208 uses the revised/updated modulus n and the revised/updated public key exponent e in message encryption and decryption transactions with the host computer, further computing and using a revised private key exponent d determined through the RSA methodology used by the host in process 118 of FIG. 1. Thus, in one example, a message m encrypted to generate an encrypted message c with the revised/updated public key (n, e) by an encryption function $C=m^e$ mod n is decrypted back into the message m with the revised/updated private key (n,d) through a decryption function $m=c^d$ mod n.

In one example of the process illustrated in FIG. 1 for a large integer "114", the host chooses a Goldbach prime pair of p=61 and q=53 is chosen at 110; ("114" is chosen only for illustrative purposes and not to represent an integer appropriate for selection in an actual encryption application; one skilled in the art will realize that larger even integers may be selected for generation of Goldbach prime pairs). At 112 the host computes the modulus n=p*q=61*53=3233, and at 114 the totient $\Phi(n)$=(p−1)(q−1)=(61−1)(53−1)=3120. At 116 the host chooses e=17, 1<e<$\Phi(n)$ and gcd(e, $\Phi(n)$)=1; and at 118 for an integer k=15, determines d from d*e=1 (mod $\Phi(n)$) and d*e=1+k $\Phi(n)$, d*e=2753*17=46801=1+15*3120, d=2753. Accordingly, a message m=123 is encrypted by the host with the revised/updated public key (n, e)=(3233,17) to generate an encrypted message c=m^e mod n=123^17 mod 3233=855, which may be decrypted back to m by the client through use of the revised/updated private key (n,d)=(3233,2753) by the function $m=c^d$ mod n=855^2753 mod 3233=123.

Alternative prime-pair keys or methods and systems for determining the appropriate Goldbach prime-pair or prime-pair number for use in revising the modulus may also be practiced. For example, the host and client may be configured to use only the smaller of the identified and retrieved Goldbach prime-pair for modulus updating and message encrypting and decrypting. Or the host and client may practice alternating methods to enhance security, for example using both of the Goldbach prime-pair numbers in a first update, the smaller number for a second, the larger number for a third, and then repeating the pattern for each subsequent update.

The use of large even integers shared by the client and host in generating the Goldbach pairs and their unique prime-pair keys enhances system security by defining shared sets of unique prime pairs, each of which may be securely chosen through sharing the prime-pair key and used to update public and private keys efficiently and securely. Prior art RSA or Data Encryption Standard (DES) systems and processes generally teach away from the use of even numbers, and the application and use of Goldbach's Conjecture in general, instead requiring the use of prime numbers for key creation and encryption, in part due to the fact that Goldbach's Conjecture has not been proven to hold over all integers. However, an advantage of the present invention is recognizing that Goldbach's Conjecture holds true over a large number set appropriate for use in asymmetric cryptography. One example by Oliveira e Silva in 2005 found that Goldbach's Conjecture holds true from two to $3 \times 10^{17}$, which according to the present invention is sufficiently large for adaptation and use in asymmetric cryptography.

The present invention thus enables the change of public and private keys on the fly or without requiring the reestablishment of handshakes between hosts and clients, in another aspect enabling host and clients to switch prime numbers used in asymmetric encryption very quickly without compromising security by transmitting the prime pairs themselves. The present invention also hides the use of the actual prime numbers used when encryption keys are changed by instead sending a prime-pair key for finding the Goldbach prime pair numbers instead of the primes themselves, thus improving system security.

II. Computerized Implementation

Figure 3:
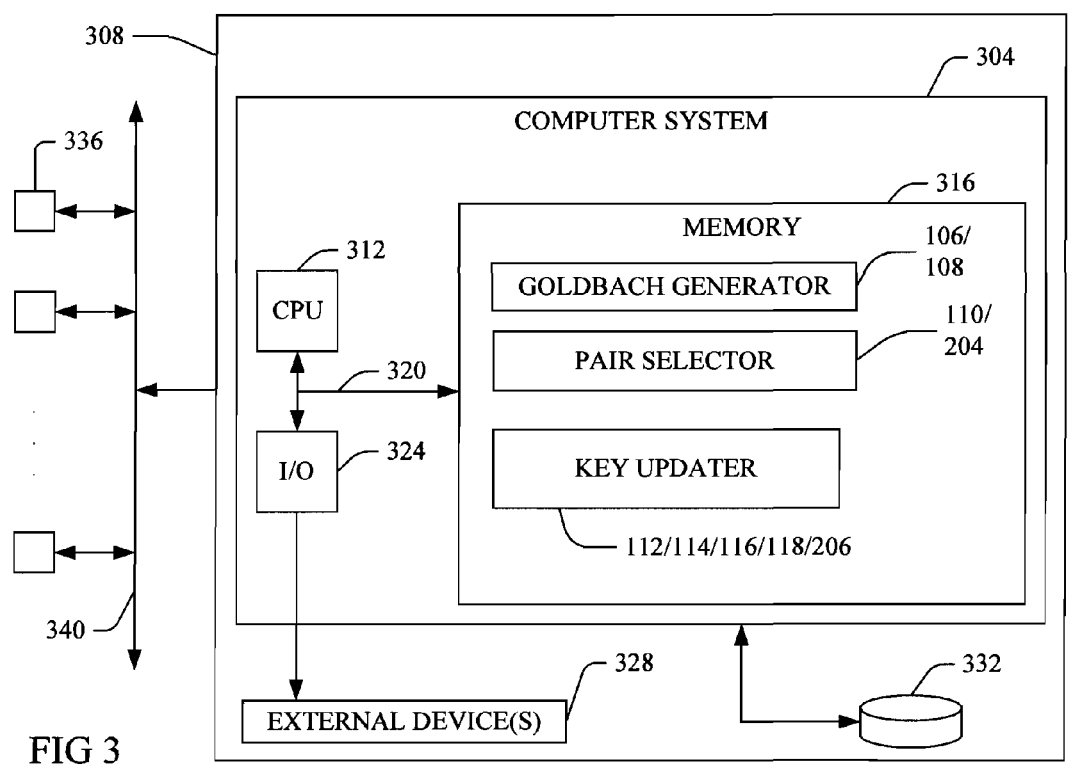
FIG. 3 is a block diagram illustrating an exemplary computerized implementation of a system and method for asymmetric cryptography according to the present invention.

The present invention may be implemented within a stand-alone asymmetric cryptography application, or as a plug-in to an existing application. The system and mechanisms described could be implemented in a hosting system or grid or in client software installed on a user's personal computer or other programmable device. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for providing asymmetric cryptography illustrated in FIGS. 1 and 2 and described above, including Goldbach prime-pair and prime-pair key generators 106/108, Goldbach prime-pair selector 110/204, and Public/private key updater 112/114/116/118/206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to provide asymmetric cryptography. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for providing asymmetric cryptography, for example by licensing methods and browser or application server technology according to the present invention to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for asymmetric cryptography, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for providing asymmetric cryptography, comprising:
   a host computer and a client computer executing a handshake, the handshake authorizing the exchange of messages encrypted and decrypted with an initially-set private key and an initially-set public key;
   the host choosing one of a plurality of prime number pairs stored on a host storage means, each of the plurality of prime number pairs stored in association with a unique prime-pair key, and updating the initially-set public key and the initially-set private key as a function of the chosen prime number pair, the updating comprising determining an updated public key exponent;
   the host sending the updated public key exponent and the unique prime-pair key associated with the chosen prime number pair to the client;
   the client using the unique prime-pair key to look-up and retrieve the chosen prime number pair from the plurality of prime number pairs stored on a client storage means;
   the client determining the updated public key and the updated private key as a function of the retrieved chosen prime number pair and the received updated public key exponent; and
   the host and the client encrypting and decrypting exchanged messages with the updated public key and the updated private key without executing another handshake.

2. The method of claim 1, further comprising:
   the host selecting a large even integer and sending the large even integer to the client;
   the host generating the plurality of prime number pairs from the selected large even integer, the prime number pair plurality comprising all prime number pairs that can sum to the selected large even integer, and the host associating each pair of the prime number pair plurality with the unique prime-pair key; and
   the client generating the prime number pair plurality from the selected large even integer received from the host, and the client storing the prime number pair plurality in a client storage means by associating each said pair with the associated unique prime-pair key.

3. The method of claim 2, the host and the client associating each pair of the prime number pair plurality with the unique prime-pair key comprising determining each unique prime-pair key with a data size smaller than a data size of an associated prime number pair.

4. The method of claim 3, the host and the client determining each unique prime-pair key as a distance between each prime number of an associated prime number pair.

5. The method of claim 4, the host and the client updating the initially-set public key and the initially-set private key comprising:
   determining a modulus equal to a product of the each prime number of the chosen prime number pair;
   determining a totient number of positive integers less than or equal to the modulus that are relatively prime to the modulus;
   determining the updated public key as comprising the modulus and a public key integer exponent, the public key integer exponent greater than one but less than the totient number and coprime to the totient number; and
   determining the updated private key as comprising the modulus and a private key integer exponent, the private key integer exponent congruent to the public key exponent.

6. The method of claim 5, comprising the host randomly choosing the large even integer or the chosen prime number pair.

7. A method for deploying an application for providing asymmetric cryptography, comprising:
   providing a host computer and a client computer infrastructure, the host and the client configured to execute a handshake authorizing the exchange of messages encrypted and decrypted with an initially-set private key and an initially-set public key;
   the host configured to choose one of a plurality of prime number pairs stored on a host storage means, each of the plurality of prime number pairs stored in association with a unique prime-pair key, and update the initially-set public key and the initially-set private key as a function of the chosen prime number pair, the updating comprising determining an updated public key exponent; and
   the client configured to use a unique prime-pair key sent by the host to look-up and retrieve the chosen prime number pair from the plurality of prime number pairs stored on a client storage means and determine the updated public key and the updated private key as a function of the retrieved chosen prime number pair and the updated public key exponent sent by the host;
   wherein the host and the client are configured to encrypt and decrypt exchanged messages with the updated public key and the updated private key without executing another handshake.

8. The method for deploying of claim 7 comprising the computer infrastructure host configured to select a large even integer and send the large even integer to the client;
   the host configured to generate the plurality of prime number pairs from the selected large even integer, the prime number pair plurality comprising all prime number pairs that can sum to the selected large even integer, and associate each pair of the prime number pair plurality with the unique prime-pair key; and
   the client configured to generate the prime number pair plurality from the selected large even integer received from the host and store the prime number pair plurality in a client storage means by associating each said pair with the associated unique prime-pair key.

9. The method for deploying of claim 8, the host and the client configured to determine each unique prime-pair key as a distance between each prime number of an associated prime number pair.

10. The method for deploying of claim 9, the host and the client configured to update the initially-set public key and the initially-set private key by:
    determining a modulus equal to a product of the each prime number of the chosen prime number pair;
    determining a totient number of positive integers less than or equal to the modulus that are relatively prime to the modulus;
    determining the updated public key as comprising the modulus and a public key integer exponent, the public key integer exponent greater than one but less than the totient number and coprime to the totient number; and
    determining the updated private key as comprising the modulus and a private key integer exponent, the private key integer exponent congruent to the public key exponent.

11. A method for providing asymmetric cryptography, comprising:
    producing computer executable program code;
    storing the code on a computer readable medium; and
    providing the program code to be deployed and executed on a first computer system, the program code comprising instructions which, when executed on the first computer system, cause the first computer system to:
    execute a handshake with a second computer system, the handshake authorizing the exchange of messages encrypted and decrypted with an initially-set private key and an initially-set public key;
    choose one of a plurality of prime number pairs stored on a first computer system storage means, each of the plurality of prime number pairs stored in association with a unique prime-pair key, and update the initially-set public key and the initially-set private key as a function of the chosen prime number pair, the updating comprising determining an updated public key exponent; and
    send the updated public key exponent and the unique prime-pair key associated with the chosen prime number pair to the second computer system;
    wherein the second computer system is configured to use the unique prime-pair key to look-up and retrieve the chosen prime number pair from the plurality of prime number pairs stored on a second computer system storage means, and determine the updated public key and the updated private key as a function of the retrieved chosen prime number pair and the received updated public key exponent; and
    wherein the first computer system and the second computer system are configured to encrypt and decrypt exchanged messages with the updated public key and the updated private key without executing another handshake.

12. The method of claim 11, the program code comprising instructions which, when executed on the first computer system, causes the first computer system to:
    select a large even integer and send the large even integer to the second computer system; generate the plurality of prime number pairs from the selected large even integer, the prime number pair plurality comprising all prime number pairs that can sum to the selected large even integer; and
    associate each pair of the prime number pair plurality with the unique prime-pair key;
    wherein the second computer system is configured to generate the prime number pair plurality from the selected large even integer received from the first computer system and store the prime number pair plurality in a second computer system storage means by associating each said pair with the associated unique prime-pair key.

13. The method of claim 12, the program code comprising instructions which, when executed on the first computer system, causes the first computer system to determine each unique prime-pair key with a data size smaller than a data size of an associated prime number pair.

14. The method of claim 13, the program code comprising instructions which, when executed on the first computer system, causes the first computer system to determine each unique prime-pair key as a distance between each prime number of an associated prime number pair.

15. The method of claim 14, the program code comprising instructions which, when executed on the first computer system, causes the first computer system conduit to update the initially-set public key and the initially-set private key by:
   determining a modulus equal to a product of the each prime number of the chosen prime number pair;
   determining a totient number of positive integers less than or equal to the modulus that are relatively prime to the modulus;
   determining the updated public key as comprising the modulus and a public key integer exponent, the public key integer exponent greater than one but less than the totient number and coprime to the totient number; and
   determining the updated private key as comprising the modulus and a private key integer exponent, the private key integer exponent congruent to the public key exponent.

16. A programmable device comprising:
   a processing means;
   a memory in communication with the processing means comprising a prime pair selector logic component and an encryption key generator logic component; and
   a network interface in communication with the processing means and the memory;
   wherein the programmable device is configured to execute a handshake with a computer system in communication with the programmable device through the network interface, the handshake authorizing the exchange of messages encrypted and decrypted with an initially-set private key and an initially-set public key;
   choose one of a plurality of prime number pairs stored on the memory, each of the plurality of prime number pairs stored in association with a unique prime-pair key, and update the initially-set public key and the initially-set private key as a function of the chosen prime number pair, the updating comprising determining an updated public key exponent; and
   send the updated public key exponent and the unique prime-pair key associated with the chosen prime number pair to the computer system;
   wherein the computer system is configured to use the unique prime-pair key to look-up and retrieve the chosen prime number pair from the plurality of prime number pairs stored on a computer system storage means and determine the updated public key and the updated private key as a function of the retrieved chosen prime number pair and the received updated public key exponent; and
   wherein the programmable device and the computer system are configured to encrypt and decrypt exchanged messages with the updated public key and the updated private key without executing another handshake.

17. The programmable device of claim 16, the memory further comprising a prime pair generator logic component;
   wherein the programmable device is configured to select a large even integer and send the large even integer to the computer system;
   generate the plurality of prime number pairs from the selected large even integer, the prime number pair plurality comprising all prime number pairs that can sum to the selected large even integer;
   associate each pair of the prime number pair plurality with the unique associated prime-pair key; and
   wherein the computer system is configured to generate the prime number pair plurality from the selected large even integer received from the programmable device and store the prime number pair plurality in the computer system storage means by associating each said pair with the associated unique prime-pair key.

18. The programmable device of claim 17, further configured to determine each unique prime-pair key with a data size smaller than a data size of an associated prime number pair.

19. The programmable device of claim 18, further configured to determine each unique prime-pair key as a distance between each prime number of an associated prime number pair.

20. The programmable device of claim 19, further configured to update the initially-set public key and the initially-set private key by:
   determining a modulus equal to a product of the each prime number of the chosen prime number pair;
   determining a totient number of positive integers less than or equal to the modulus that are relatively prime to the modulus;
   determining the updated public key as comprising the modulus and a public key integer exponent, the public key integer exponent greater than one but less than the totient number and coprime to the totient number; and
   determining the updated private key as comprising the modulus and a private key integer exponent, the private key integer exponent congruent to the public key exponent.

* * * * *